United States Patent
Xi

(10) Patent No.: US 6,879,120 B2
(45) Date of Patent: Apr. 12, 2005

(54) SPEED CONTROL CIRCUIT OF BRUSHLESS DC FAN MOTOR

(75) Inventor: Junnan Xi, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/782,809

(22) Filed: Feb. 23, 2004

(65) Prior Publication Data

US 2004/0164692 A1 Aug. 26, 2004

Related U.S. Application Data

(63) Continuation of application No. 10/178,732, filed on Jun. 25, 2002, now abandoned.

(30) Foreign Application Priority Data

Jun. 25, 2001 (JP) ........................................ 2001-191385

(51) Int. Cl.[7] .................................................. H02P 1/18
(52) U.S. Cl. ........................ 318/254; 318/471; 318/473; 388/800; 388/806; 388/811
(58) Field of Search ........................ 318/254, 471–473; 388/800, 806, 804, 811, 815, 819, 821, 822, 823

(56) References Cited

U.S. PATENT DOCUMENTS

| | | | |
|---|---|---|---|
| 4,337,497 A | * | 6/1982 | Dalle Carbonare ......... 361/239 |
| 4,506,199 A | | 3/1985 | Asche |
| 5,197,858 A | | 3/1993 | Cheng |
| 5,234,050 A | | 8/1993 | Weigert |
| 5,245,256 A | | 9/1993 | Cassat et al. |
| 5,457,766 A | | 10/1995 | Ko |
| 5,534,854 A | * | 7/1996 | Bradbury et al. ........... 340/648 |
| 5,548,453 A | | 8/1996 | Sasaki et al. |
| 5,929,581 A | | 7/1999 | Van Brocklin et al. |
| 5,942,866 A | * | 8/1999 | Hsieh ......................... 318/268 |
| 5,991,700 A | | 11/1999 | Clay et al. |
| 6,040,668 A | * | 3/2000 | Huynh et al. ................ 318/471 |
| 6,135,718 A | | 10/2000 | Yang |
| 6,188,187 B1 | | 2/2001 | Harlan |
| 6,285,146 B1 | | 9/2001 | Harlan |
| 6,385,395 B1 | | 5/2002 | Horng et al. |

* cited by examiner

Primary Examiner—Rina Duda
(74) Attorney, Agent, or Firm—Oliff & Berridge, PLC

(57) ABSTRACT

There is provided a brushless DC fan motor which can eliminate an oscillator for PWM, control the motor speed at a low cost with high accuracy, and efficiently adjust the temperature in a housing for electronic appliances when radiating the heat in the housing. The brushless DC fan motor with the rotational speed thereof controlled by controlling the voltage of a control input terminal of a drive circuit comprises a differential amplifier in which the voltage signal for controlling the speed is inputted in a first input terminal and the reference voltage signal is inputted in a second input terminal. The differential amplifier is linear in the input-output characteristic, and can set the rise characteristic of a desired gradient, and control the motor speed with high accuracy without using the PWM signal for the input signal. The voltage signal from the output terminal of the differential amplifier is given to the control input terminal of the drive circuit.

16 Claims, 2 Drawing Sheets

SPEED CONTROL CIRCUIT OF BRUSHLESS DC FAN MOTOR

This is a continuation of application Ser. No. 10/178,732, filed Jun. 25, 2002, now abandoned.

BACKGROUND OF THE INVENTION

1. Field of the Invention

The present invention relates to a brushless DC fan motor suitable for a fan radiating heat from a housing of an electronic appliance, and more particularly to a speed control circuit thereof

2. Description of the Related Art

In electronic appliance such as OA appliances including personal computers and copiers, a large number of electronic components are accommodated in a small housing, whereby heat is generated from the electronic components and accumulated in the housing so as to have a possibility to damage the electronic components.

To solve this problem, a ventilation hole is provided in a wall or a ceiling of the housing, and a fan motor is mounted on the ventilation hole so as to radiate heat outside of the housing.

For using the brushless DC fan motor by making the temperature of the housing controlled, the speed of the motor should be accurately controlled.

FIG. 2 shows a speed control circuit of a conventional brushless DC fan motor meeting this request.

In the figure, numeral 21 denotes the speed control circuit of the brushless DC fan motor (circuit) 22. The two-phase motor 22 is employed here.

As shown in the figure, the brushless DC in motor 22 comprises field coils L1 and L2, switching elements SW1 and SW2, Zener diodes ZD1 and ZD2, resistors R1 to R4, a diode D1 and a drive circuit 22a.

The field coils L1 and L2 are mounted on a stator (not shown) and electrified in an alternately switching manner to form the rotating magnetic field by the switching elements SW1 and SW2 alternately turning ON/OFF by the control signal from the drive circuit 22a. A rotor (not shown) is rotated by rotating a permanent magnet mounted thereon following the above rotating magnetic field.

The position signals S1 and S2 from a sensor to detect the position of rotation of the rotor are inputted in the drive circuit 22a as the timing signal of switching and electrifying the field coils L1 and L2.

The speed control circuit 21 comprises resistors R5 to R10 and an NPN transistor Q1. The signal (PWM signal) in which the temperature in a housing for an OA appliance (not shown) is Pulse-Width Modulated (PWM, i.e., the signal in which the temperature in the above housing is converted into the pulse width (time) ratio on the H (High) and L (Low) levels of the voltage is inputted as the input signal in an input terminal IN of the speed control circuit 21. The inverted signal of the above input signal is outputted from an output terminal OUT of the speed control circuit 21.

The speed control circuit 21 either validates or invalidates the control signal to the switching elements SW1 and SW2 of the motor 22 in the drive circuit 22a by the voltage level of the output signal.

More specifically, the speed control circuit 21 validates the above control signal when the voltage Vb of the output terminal OUT (a control input terminal 22b of the drive circuit 22a) is less than a predetermined value (the L-level).

As a result, the switching elements SW1 and SW2 are alternately turned ON/OFF. When the voltage Vb is not less than the predetermined value (the H-level), the speed control circuit invalidates the above control signal, and turns off the switching elements SW1 and SW2.

The driving force is given to the rotor by alternately electrifying the field coils L1 and L2, or the driving force is not removed from the rotor by shutting off the electrification to the field coils L1 and L2, and the rotational speed of the motor 22 is thus controlled.

In such a speed control circuit 21, when the temperature in the housing increases and the H-level time of the PWM signal to be inputted in the input terminal IN is increased, the H-level time of the base voltage of the transistor Q1 also increases, and the L-level time of the voltage Vb of the output terminal OUT increases.

As a result, the L-level time of the input voltage in the drive circuit 22a, i.e., the time in which the above control signal is valid is also increased, the time in which the driving force is continuously given to the rotor (not shown) is increased, and the rotational speed of the motor is thus increased.

As a result, the heat radiation effect is improved so as to decrease the temperature in the above housing. Thus, if the PWM signal in which the temperature in the housing is pulse-width modulated is set to be the input signal of the speed control circuit 21, the drive circuit 22a can be finely controlled by the ratio of the H-level to the L-level, the speed of the motor 22 can be accurately controlled such that the temperature in the housing can be efficiently adjusted.

In the conventional speed control circuit 21 described above, the PWM signal has been used for the input signal for the follow reason. That is, an operational point is established on the voltage level in a rise characteristic curve of the transistor Q1 when the output voltage is taken out from a collector by using the voltage signal of the continuously changing level for the base input signal of the transistor Q1 like the temperature detecting output voltage from a thermistor.

However, the transistor Q1 has a steep but non-linear rise characteristic, and is difficult to set the above operational point. Thus, it is difficult to improve the accuracy in controlling the speed by either validating or invalidating the control signal to the switching elements SW1 and SW2 with a predetermined temperature (the voltage level of the input signal) as a reference.

On the other hand, when the PWM signal is used for the input signal, the temperature is expressed by the pulse width, i.e., the length on the time axis, and thus, the above operational point need not be finely set, and the setting thereof can be simplified. Accordingly, the conventional speed control circuit 21 has used the PWM signal for the input signal.

However, the conventional speed control circuit 21 requires an element to convert the original physical quantity used to control the speed, i.e., the temperature here into the electric signal, for example, an expensive oscillator for PWM to convert the electric signal into the electric signal in addition to the thermistor, and there occurs a problem, in that the cost required for a circuit of the prestage is considerably increased.

SUMMARY OF THE INVENTION

Accordingly, the present invention has been made in light of the above problems, and an object of the present invention is to provide a speed control circuit of a brushless DC fan motor which can eliminate any expensive elements or circuits of the prestage, control the motor speed at a low cost with high accuracy, and efficiently adjust the temperature in a housing for an electronic appliance especially when applied for radiating heat outside of the housing.

In order to solve the above problem, according to a first aspect of the present invention, there is provided a speed control circuit of a brushless DC fan motor driven by a drive circuit, and controlled in the rotational speed thereof by controlling the voltage of a control input terminal of the drive circuit, and comprises a differential amplifier in which the voltage signal for controlling the speed is inputted in a first input terminal and the reference voltage signal is inputted in a second input terminal, wherein the differential amplifier is linear in the input-output characteristic, and can set a rise characteristic of a desired gradient, and give the voltage signal from the output terminal of the differential amplifier to the control input terminal of the drive circuit.

According to a second aspect of the present invention, a speed control circuit of a brushless DC fan motor of the first aspect is characterized in that the reference voltage signal of the differential amplifier is given from a resistance voltage division point of a resistance voltage divider connected between a power source for driving the circuit and the ground, and the resistance of the resistance voltage divider is set to be an appropriate value in order to obtain a desired minimum rotational speed.

According, to a third aspect of the present invention, a speed control circuit of a brushless DC fan motor, according to the first or second aspect of the present invention is characterized in that the voltage signal for controlling the speed is inputted in the first input terminal of the differential amplifier via a first resistor for setting the amplification degree, a second resistor for setting the amplification degree is connected between the first input terminal and the output terminal of the differential amplifier, a desired amplification degree is obtained for the differential amplifier by suitably setting the resistance of the first and second resistors for setting the amplification degree, and a desired rate of change in the rotational speed is set.

According to a fourth aspect of the present invention, a speed control circuit of a brushless DC fan motor according to any one of the first to third aspects of the present invention is characterized in that the first input terminal and the second input terminal of the differential amplifier are grounded individually via a capacitor.

According to a fifth aspect of the present invention, a speed control circuit of a brushless DC fan motor according to any one of the first to fourth aspects of the present invention is characterized in that the voltage signal from the output terminal of the differential amplifier is given to the control input terminal of the drive circuit via a resistor for finely adjusting the rotational speed.

According to a sixth aspect of the present invention, a speed control circuit of a brushless DC fan motor according to any one of the first to fifth aspects of the present invention is characterized in that a voltage signal transmission line from the output terminal of the differential amplifier to the control input terminal of the drive circuit is grounded at a desired point via a capacitor.

DESCRIPTION OF THE PREFERRED EMBODIMENTS

The embodiments of the present invention will be described with reference to attached drawings.

Figure 1:
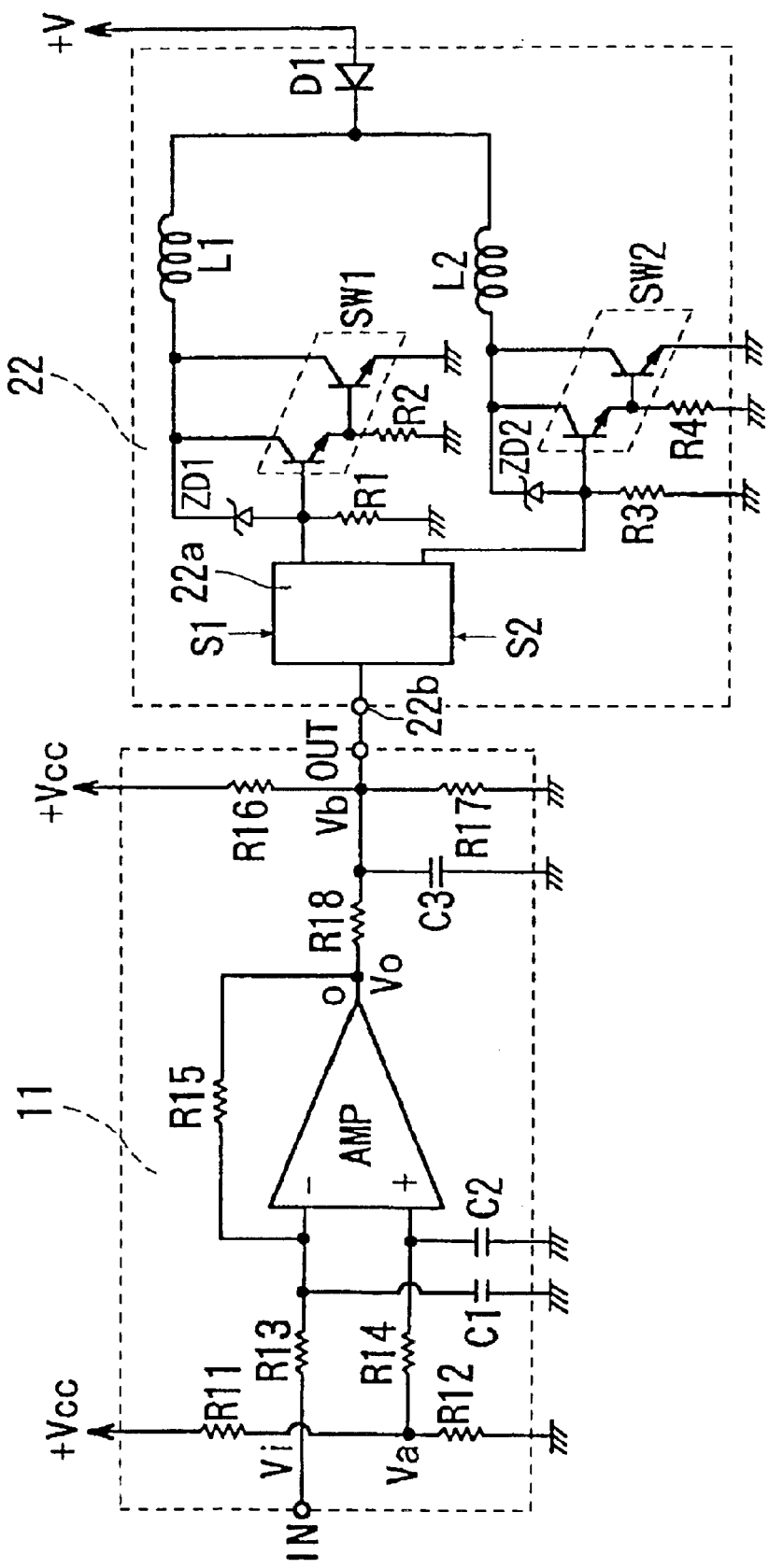
FIG. 1 shows a speed control circuit of a brushless DC fan motor according to a first embodiment of the present invention.

FIG. 1 shows a speed control circuit of a brushless DC fan motor according to a first embodiment of the present invention.

In the figure, numeral 11 denotes a speed control circuit of a brushless DC fan motor (circuit) 22. A two-phase motor 32 is shown here. Symbols +V and +Vcc denote a power source for driving the motor and the speed control circuit, respectively.

The above brushless DC fan motor 22 comprises field coils L1 and L2, switching elements SW1 and SW2, Zener diodes ZD1 and ZD2, resistors R1 to R4, a diode D1 and a drive circuit 22a.

In this configuration, the field coils L1 and L2 are mounted on a stator (not shown), and electrified in an alternately switching manner to form the rotating magnetic field by the switching elements SW1 and SW2 which are alternately turned ON/OFF by the control signal from the drive circuit 22a. A rotor (not shown) is rotated by rotating a permanent magnet mounted thereon following the above rotating magnetic field.

The position signals S1 and S2 from a sensor to detect the position of rotation of the above rotor (the permanent magnet), for example, a Hall element, are inputted in the drive circuit 22a as the timing signal of switching and electrifying the field coils L1 and L2.

The speed control circuit 11 comprises resistors R11 to R18, capacitors C1–C3, and a differential amplifier AMP. The speed control circuit 11 either validates or invalidates the control signal to the switching elements SW1 and SW2 of the motor 22 in the drive circuit 22a by the voltage level of the output signal therefrom.

More specifically, the speed control circuit 11 validates the above control signal when the voltage level Vb of the output terminal OUT (a control input terminal 22b of the drive circuit 22a) is less than a predetermined value (the L-level). As a result, the switching elements SW1 and SW2 are alternately turned ON/OFF. When the voltage level Vb is not less than the predetermined value (the H-level), the speed control circuit invalidates the above control signal, and turns off the switching elements SW1 and SW2.

This means that the driving force is given to the rotor by alternately electrifying the field coils L1 and L2, or the driving force is removed from the rotor by shutting off the electrification to the field coils L1 and L2, and the rotational speed of the motor 22 is thus controlled.

The speed-control circuit 11 will be described below m detail.

The differential amplifier AMP is linear in the input-output characteristic and easy in setting the rise characteristic (the amplification degree) of a desired gradient, and comprises an operational amplifier, The voltage signal Vi for controlling the rotational speed of the motor which is inputted in an input terminal IN is inputted in En inverting input terminal − of the differential amplifier (the operational amplifier) AMP via the resistor R13. The reference voltage signal Va with the voltage level set by the resistance voltage dividers (the resistors R11 and R12) connected between the above power source +Vcc and the ground is inputted in a non-inverting input terminal + of the differential amplifier AMP via the resistor R14.

The above control voltage signal Vi is the voltage signal with the level thereof continuously changed according to the temperature in a housing of an OA appliance, for example, the temperature detecting output voltage signal by a thermistor (not shown). The reference voltage signal Va is the voltage corresponding to the preset temperature of detection, in other words, the voltage corresponding to the minimum rotational speed, and the minimum rotational speed of the motor 22 corresponding to the predetermined temperature of detection is set by the set value of this voltage.

The resistor R15 is a resistor to set the amplification degree (the gradient of the rise characteristic) of, the differential, amplifier AMP, in other words, the rate of change of the rotational speed of the motor 22 together with the resistor R13, and connected by the inverting input terminal − and the output terminal of the differential amplifier AMP.

The resistors R16 and R17 are resistors to set the voltage of the control input terminal 22b of the drive circuit 22a at a predetermined voltage level. The output signal Vo of the speed control circuit 11 controls the voltage level Vb of the output terminal OUT in a predetermined range with the voltage set by the above resistors R16 and R17 as the reference.

The resistors R13 and R14 are set to be the same resistance. Symbols R13 and R14 also denote each resistance thereof, and symbols Vi and Va also denote each voltage (Revel) thereof.

In the above configuration, the output voltage Vo of the differential amplifier AMP is obtained by the following formula (1)

$$Vo = -\{(Vi-Va)\cdot(R13/R15)\} \quad (1)$$

The voltage level Vb of the control input terminal 22b is obtained by the following formula (2)

$$Vb = -Va(R13/R15)\cdot Vi + Va(R13/R15) \quad (2)$$

The resistor R18 is inserted between an output terminal o of the differential amplifier AMP and the above control input terminal 22b in order to finely adjust the voltage level Vb of the control input terminal 22b of the drive circuit 22a, and is valid in finely adjusting the rotational speed of the motor.

The capacitor C1 and the capacitor C2 are capacitors for removing noise which are inserted between the inverting input terminal − of the differential amplifier AMP and the ground, and between the non-inverting input terminal + of the differential amplifier AMP and the ground, respectively, and are effective to obtain the stable rotational speed.

The capacitor C3 is a smoothing capacitor connected between the control input terminal 22b of the drive circuit 22a and the ground. The capacitor C3 is not essential in the speed control circuit 11 in accordance with the present invention. However, the PWM signal can be used for the input signal if this capacitor is added to the speed control circuit.

Next, the operation will be described.

The differential amplifier AMP outputs the voltage signal which is obtained by amplifying the difference in the voltage level between the control voltage signal Vi and the reference voltage signal Va at the amplification degree set by the resistors R13 and R15. The output voltage Vo of the differential amplifier AMP is reverse in polarity to the control voltage signal Vi (refer to the formula (1) above).

When the temperature in the housing for the OA appliance increases, and the temperature detecting output voltage by the thermistor (not shown) is dropped, the voltage level of the control voltage signal Vi inputted in the input terminal IN (the inverting input terminal − of the differential amplifier AMP) of the speed control circuit 11 is dropped. As a result, the output voltage Vo from the output terminal o of the differential amplifier AMP is increased to the voltage obtained by the formula (1) above, and the voltage level Vb of the output terminal OUT of the speed control circuit 11 (the control input terminal 22b of the drive circuit 22a) is also increased to the voltage obtained by the formula (2) above.

When the increased voltage level Vb is not less than the voltage level to validate the control signal to the switching elements SW1 and SW2 of the motor 22, the control signal becomes valid.

Thus, the switching elements SW1 and SW2 of the motor 22 are alternately turned ON/OFF, the field coils L1 and L2 are alternately electrified, and the driving force is given to the rotor (not shown). As a result, the motor 22 is started or accelerated, and the radiation of heat in the housing is started or increased so as to drop the temperature in the housing.

The above operation is continued until the voltage level Vb is dropped below the voltage level at which the control signal to the switching elements SW1 and SW2 is validated, and the temperature in the housing is continuously dropped.

When the temperature in the housing is dropped, and the temperature detecting output voltage by the thermistor (not shown) is increased, the voltage level of the control voltage signal Vi inputted in the input terminal IN of the speed control circuit 11 (the inverting input terminal − of the differential amplifier AMP) is increased. As a result, the output voltage Vo from the output terminal o of the differential amplifier AMP dropped to the voltage obtained by the formula (1) above, and the voltage level Vb of the output terminal OUT of the speed control circuit 11 (the control input terminal 22b of the drive circuit 22a) is also dropped to the voltage obtained by the formula (2) above.

When the dropped voltage level Vb reaches the voltage level at which the control signal to the switching elements SW1 and SW2 of the motor becomes invalid, the control signal becomes invalid.

As a result, the switching elements SW1 and SW2 of the motor 22 are turned off, the electrification to the field coils L1 and L2 is shut off, and the driving force on the rotor is removed. As a result, the rotor is subjected to the inertial rotation, i.e., the decelerated rotation, the radiation of heat in the housing is gradually reduced, and soon, the rotor is stopped, and the heat radiation is completed.

When the temperature in the housing increases while the rotor is stopped or under the decelerated rotation, and the voltage level Vb of the output terminal OUT of the speed control circuit 11 is not less than the voltage level at which the control signal to the switching elements SW1 and SW2 of the motor 22 is valid, the above switching elements SW1 and SW2 are alternately turned ON/OFF again.

As a result, the field coils L1 and L2 are alternately electrified, and the driving force is given to the rotor, and the rotor is started or accelerated. As a result, heat is started to be radiated outside of the housing, or the radiation is increased, and the temperature in the housing is dropped. These operations are repeated to efficiently adjust the temperature in the housing to be within a predetermined range.

In addition, the speed of the motor 22 can be accurately controlled without using any PWM signal for the input signal, and the temperature in the housing can be efficiently adjusted.

Figure 2:
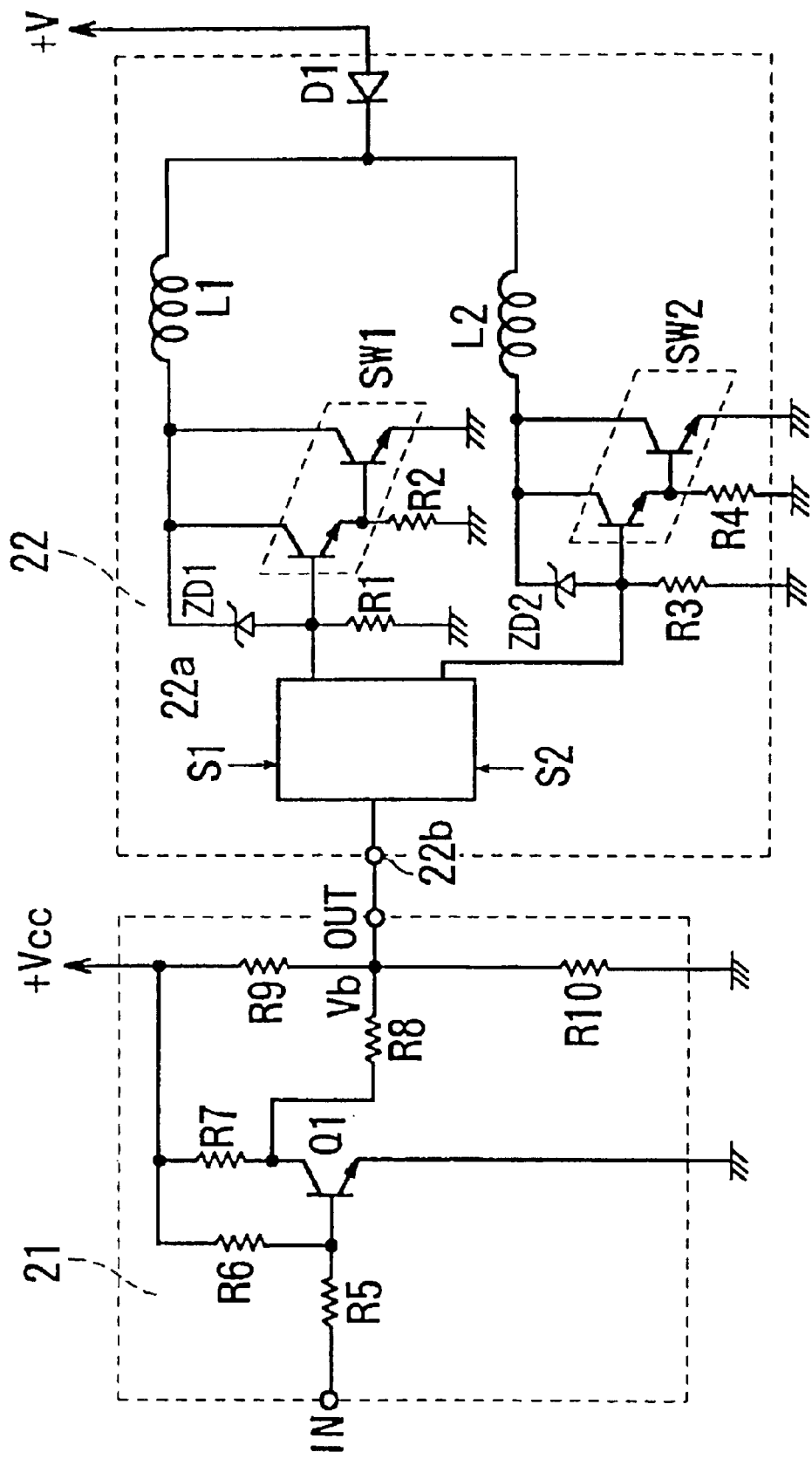
FIG. 2 shows a speed control circuit of a conventional brushless DC fan motor.

This means that not a transistor (refer to Q1 in FIG. 2) in a conventional circuit, but the differential amplifier AMP which is linear in the input-output characteristic and easy in setting the rise characteristic (the amplification degree) of a desired gradient is used in the present invention. As a result, the accuracy in controlling the speed by either Validating or invalidating the control signal to the switching elements SW1 and SW2 with a given temperature (the voltage level of the input signal) as the reference can be improved not by using the PWM signal for the input signal, but by using the temperature detecting output voltage signal by an inexpensive sensor such as a thermistor.

In the above embodiment, an Explanation is given with the two-phase brushless DC fan motor as an example, but any polyphase brushless DC fan motor such as a three-phase motor can be controlled.

Further, the above embodiment describes a case in which the speed of the brushless DC fan motor is controlled by detecting the temperature, but the brushless DC fan motor may be controlled by other physical quantities including the humidity and the concentration of the smoke or the gas.

As described above, the speed control circuit of the brushless DC fan motor in accordance with the present invention has advantages in that any expensive elements or circuits of the prestage are unnecessary, the motor speed can be controlled at a low cost with high accuracy, and the temperature in the housing can be efficiently adjusted particularly when the speed control circuit is used for radiating the heat in electronic appliances.

Further, in the present invention, the minimum rotational speed, the rate of change of the rotational speed, the fine adjustment of the rotational speed, and the stable rotational speed can be realized by a simple means by adding resistors and/or capacitors, or settings these values. In addition, the PWM signal can be used for the input signal.

What is claimed is:

1. A speed control circuit of a brushless DC an motor which is driven by a drive circuit, and controlled in the rotational speed thereof by controlling a voltage supplied to a control input terminal of the drive circuit, the speed control circuit comprising:

a differential amplifier that is linear in an input-output characteristic, and having a first input terminal to which a voltage signal for controlling the speed is inputted, and having a second input terminal to which a reference voltage signal is inputted, wherein the differential amplifier can set a rise characteristic of a desired gradient, and has an output terminal by which the voltage is supplied to the control input terminal of the drive circuit.

2. The speed control circuit of a brushless DC fan motor according to claim 1, wherein the reference voltage signal of the differential amplifier is given from a resistance voltage division point of a resistance voltage divider connected between a power source for driving the circuit and the ground, and the resistance of the resistance voltage divider is set to be an appropriate value in order to obtain a desired minimum rotational speed.

3. The speed control circuit of a brushless DC fan motor according to claim 1, wherein the voltage signal for controlling the speed is inputted in the first input terminal of the differential amplifier via a first resistor for setting the amplification degree, a second resistor for setting the amplification degree is connected between the first input terminal and the output terminal of the differential amplifier, a desired amplification degree is obtained for the differential amplifier by suitably setting the resistance of the first and second resistors for setting the amplification degree, and a desire rate of change in the rotational speed is set.

4. The speed control circuit of a brushless DC fan motor according to claim 1, wherein the first input terminal and the second input terminal of the differential amplifier are grounded individually via a capacitor.

5. The speed control circuit of a brushless DC fan motor according to claim 1, wherein the voltage from the output terminal of the differential amplifier is given to the control input terminal of the drive circuit via a resistor for finely adjusting the rotational speed.

6. The speed control circuit of a brushless DC fan motor according to claim 1, wherein a voltage signal transmission line from the output terminal of the differential amplifier to the control input terminal of the drive circuit is grounded at a desired point via a capacitor.

7. The speed control circuit of a brushless DC fan motor according to claim 2, wherein the voltage signal for controlling the speed is inputted in the first input terminal of the differential amplifier via a first resistor for setting the amplification degree, a second resistor for setting the amplification degree is connected between the first input terminal and the output terminal of the differential amplifier, a desired amplification degree is obtained for the differential amplifier by suitably setting the resistance of the first and second resistors for setting the amplification degree, and a desired rate of change in the rotational speed is set.

8. The speed control circuit of a brushless DC fan motor according to claim 2, wherein the first input terminal and the second input terminal of the differential amplifier are grounded individually via a capacitor.

9. The speed control circuit of a brushless DC fan motor according to claim 3, wherein the first input terminal and the second input terminal of the differential amplifier are grounded individually via a capacitor.

10. The speed control circuit of a brushless DC fan motor according to claim 2, wherein the voltage from the output terminal of the differential amplifier is given to the control input terminal of the drive circuit via a resistor for finely adjusting the rotational speed.

11. The speed control circuit of a brushless DC fan motor according to claim 3, wherein the voltage from the output terminal of the differential amplifier is given to the control input terminal of the drive circuit via a resistor for finely adjusting the rotational speed.

12. The speed control circuit of a brushless DC fan motor according to claim 4, wherein the voltage from the output terminal of the differential amplifier is given to the control input terminal of the drive circuit via a resistor for finely adjusting the rotational speed.

13. The speed control circuit of a brushless DC fan motor according to claim 2, wherein a voltage signal transmission line from the output terminal of the differential amplifier to the control input terminal of the drive circuit is grounded at a desired point via a capacitor.

14. The speed control circuit of a brushless DC fan motor according to claim 3, wherein a voltage signal transmission line from the output terminal of the differential amplifier to the control input terminal of the drive circuit is grounded at a desired point via a capacitor.

15. A speed control circuit of a brushless DC fan motor according to claim 4, wherein a voltage signal transmission line from the output terminal of the differential amplifier to the control input terminal of the drive circuit is grounded at a desired point via a capacitor.

16. A speed control circuit of a brushless DC fan motor according to claim 5, wherein a voltage signal transmission line from the output terminal of the differential amplifier to the control input terminal of the drive circuit is grounded at a desired point via a capacitor.

* * * * *